US010316765B2

(12) United States Patent
Nomura

(10) Patent No.: US 10,316,765 B2
(45) Date of Patent: Jun. 11, 2019

(54) CONTROL DEVICE AND CONTROL METHOD FOR INTERNAL COMBUSTION ENGINE

(71) Applicant: TOYOTA JIDOSHA KABUSHIKI KAISHA, Toyota-shi (JP)

(72) Inventor: Mitsuhiro Nomura, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 271 days.

(21) Appl. No.: 14/424,345

(22) PCT Filed: Nov. 15, 2013

(86) PCT No.: PCT/IB2013/002551
§ 371 (c)(1),
(2) Date: Feb. 26, 2015

(87) PCT Pub. No.: WO2014/083397
PCT Pub. Date: Jun. 5, 2014

(65) Prior Publication Data
US 2015/0211424 A1 Jul. 30, 2015

(30) Foreign Application Priority Data

Nov. 29, 2012 (JP) ................................. 2012-261233

(51) Int. Cl.
F02D 13/02 (2006.01)
F02D 41/22 (2006.01)
(Continued)

(52) U.S. Cl.
CPC .......... F02D 13/0234 (2013.01); F01L 1/352 (2013.01); F02D 13/0238 (2013.01);
(Continued)

(58) Field of Classification Search
CPC ......... F02D 2041/001; F02D 2041/227; F02D 41/222; F02D 41/403; F02D 41/405;
(Continued)

(56) References Cited

U.S. PATENT DOCUMENTS 4,552,112 A * 11/1985 Nagao ....................... F01L 1/26
123/308
6,035,826 A * 3/2000 Matsuoka ............. F02D 41/009
123/406.62

(Continued)

FOREIGN PATENT DOCUMENTS

JP 2001342888 A * 12/2001
JP 2002-195092 7/2002
(Continued)

OTHER PUBLICATIONS

International Search Report dated May 12, 2014, in PCT/IB13/002551 filed Nov. 15, 2013.

Primary Examiner — Mahmoud Gimie
Assistant Examiner — Joshua Campbell
(74) Attorney, Agent, or Firm — Oblon, McClelland, Maier & Neustadt, L.L.P.

(57) ABSTRACT

A control device for an internal combustion engine includes an intake-side variable valve timing mechanism and a controller. The intake-side variable valve timing mechanism is configured to continuously advance or retard a phase of a cam that actuates an intake valve. The controller is configured to actuate the intake-side variable valve timing mechanism toward a retardation side and position the intake-side variable valve timing mechanism at a prescribed position, and execute fail-safe control on the basis of a signal from a cam position sensor instead of a signal from the crank position sensor, when it is determined that there is a failure in a crank position sensor of the internal combustion engine.

15 Claims, 8 Drawing Sheets

(51) Int. Cl.
*F01L 1/352* (2006.01)
*F02D 41/04* (2006.01)
*F01L 1/053* (2006.01)
*F02D 41/00* (2006.01)

(52) U.S. Cl.
CPC ........... *F02D 41/04* (2013.01); *F02D 41/222* (2013.01); *F01L 2001/0537* (2013.01); *F01L 2250/02* (2013.01); *F01L 2800/12* (2013.01); *F01L 2820/041* (2013.01); *F01L 2820/042* (2013.01); *F02D 41/009* (2013.01); *F02D 2041/001* (2013.01); *F02D 2041/227* (2013.01); *Y02T 10/18* (2013.01); *Y02T 10/40* (2013.01)

(58) Field of Classification Search
CPC .. F02D 13/0238; F02D 13/0234; F02D 41/04; F02D 41/009; F01L 2820/041; F01L 1/352; F01L 2001/0537; F01L 2250/02; F01L 2820/042; Y02T 10/18; Y02T 10/40
USPC .................... 123/90.15, 90.16, 472
See application file for complete search history.

(56) References Cited

U.S. PATENT DOCUMENTS

| | | | | |
|---|---|---|---|---|
| 2001/0019267 A1* | 9/2001 | Shimizu | ............... | F02D 41/009 324/386 |
| 2002/0078925 A1* | 6/2002 | Kobayashi | ............ | F02D 41/009 123/406.18 |
| 2004/0084000 A1 | 5/2004 | Takenaka et al. | | |
| 2005/0076867 A1 | 4/2005 | Tani | | |
| 2005/0235938 A1 | 10/2005 | Tani et al. | | |
| 2005/0257762 A1* | 11/2005 | Sawada | ................... | F01L 1/022 123/90.17 |
| 2006/0042578 A1* | 3/2006 | Izumi | ...................... | F01L 1/022 123/90.17 |
| 2006/0178803 A1 | 8/2006 | Nakamura | | |
| 2008/0083384 A1* | 4/2008 | Morii | ...................... | F01L 1/352 123/90.15 |
| 2010/0224153 A1* | 9/2010 | Ichimoto | .................. | F01L 1/34 123/90.17 |
| 2012/0055429 A1* | 3/2012 | Nakamura | ............ | F01L 1/3442 123/90.17 |

FOREIGN PATENT DOCUMENTS

| | | |
|---|---|---|
| JP | 2005-133708 | 5/2005 |
| JP | 2005-307910 | 11/2005 |
| JP | 2006-214386 | 8/2006 |
| JP | 2008-95550 | 4/2008 |
| JP | 2010-1864 | 1/2010 |
| JP | 2010-255494 | 11/2010 |
| JP | 2011-247154 | 12/2011 |

* cited by examiner

FIG. 2A
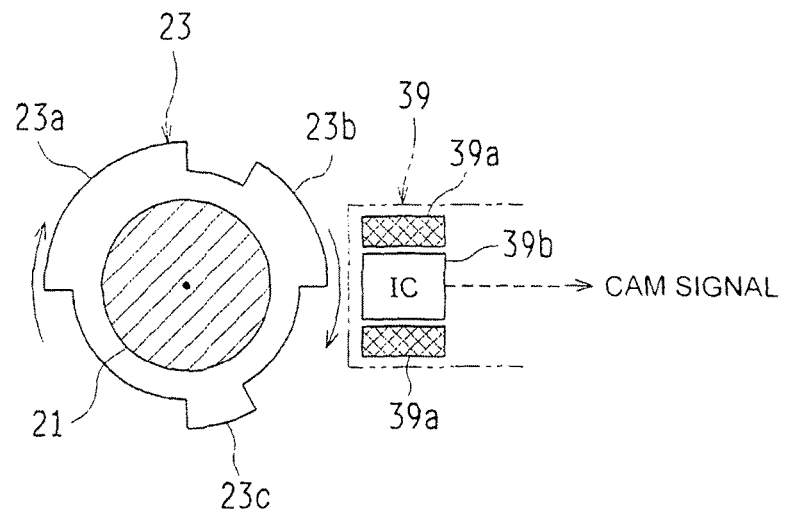
FIG. 2B
FIG. 2C
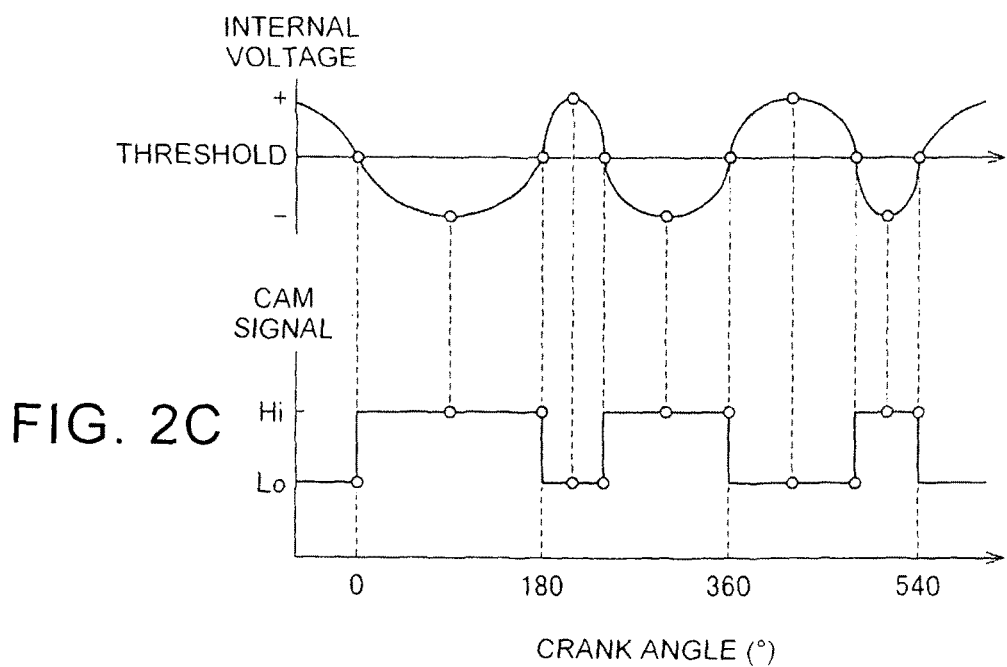

CONTROL DEVICE AND CONTROL METHOD FOR INTERNAL COMBUSTION ENGINE

BACKGROUND OF THE INVENTION

1. Field of the Invention

The invention relates to a control device and control method for an internal combustion engine mounted on a vehicle, or the like, and, more particularly, to a control device and control method for an internal combustion engine that includes a variable valve mechanism that is able to change the operation timing of an intake valve.

2. Description of Related Art

Internal combustion engines mounted on vehicles, or the like, increasingly employ a variable valve timing (VVT) mechanism that allows the operation timing of an intake valve to be variable. For example, Japanese Patent Application Publication No. 2006-214386 (JP 2006-214386 A) describes a configuration that an output shaft of an electric motor is coupled to a camshaft that actuates an intake valve and then an intake-side cam phase is continuously advanced or retarded through control over the rotation speed of the electric motor.

In JP 2006-214386 A, a rotation sensor is provided in the electric motor, and the rotation speed or rotation position of the electric motor is detected by a signal from the rotation sensor. When there occurs a failure in a crank position sensor, so-called fail-safe control is executed. In the fail-safe control, fuel injection, ignition timing, and the like, of the internal combustion engine are controlled by utilizing the signal from the rotation sensor of the electric motor instead of a signal from the crank position sensor (crank signal).

SUMMARY OF THE INVENTION

As in the case of JP 2006-214386 A, the rotation sensor of the electric motor of the VVT mechanism is able to detect the rotation phase of the camshaft, and this rotation phase of the camshaft may differ from the rotation phase of a crankshaft. Normally, the cam phase with respect to the crank phase is calculated on the basis of the signal from the crank position sensor and the signal from the cam position sensor. However, if a signal is no longer output from the crank position sensor due to a broken wire, or the like, it may not be able to discriminate a variation in the cam phase even when the cam phase varies.

Therefore, if the position of the VVT mechanism is, for example, displaced by reaction at the time when the intake valve is actuated in the event of occurrence of the above-described failure and, as a result, the cam phase has varied, it may not be able to execute accurate control even when the signal from the rotation sensor of the VVT mechanism is substituted for the crank signal as in the case of JP 2006-214386 A. This also applies to the case where the signal from the cam position sensor (cam signal) is substituted for the crank signal.

The invention provides a control device and control method for an internal combustion engine including an intake-side variable valve timing mechanism, which achieves accurate fail-safe control while a cam signal is substituted for a crank signal in the event of a failure in a crank position sensor.

A first aspect of the invention provides a control device for an internal combustion engine. The control device includes an intake-side variable valve timing (VVT) mechanism and a controller. The intake-side VVT mechanism is configured to continuously advance or retard a phase of a cam that actuates an intake valve. The controller is configured to, when it is determined that there is a failure in a crank position sensor of the internal combustion engine, actuate the intake-side VVT mechanism toward a retardation side and position the intake-side VVT mechanism at a prescribed position, and execute fail-safe control on the basis of a signal from a cam position sensor (cam signal) instead of a signal from the crank position sensor (crank signal).

With the above control device, when there occurs a failure in the crank position sensor during operation of the internal combustion engine, the controller actuates the intake-side VVT mechanism toward the retardation side and position the intake-side VVT mechanism at the prescribed position, and, for example, execute fail-safe control over fuel injection, ignition, and the like, on the basis of the cam signal instead of the crank signal.

At this time, the intake-side VVT mechanism is positioned at the prescribed position and the cam phase does not vary, so it is possible to accurately control the timing of fuel injection, ignition, and the like, even when the cam signal is used instead of the crank signal. However, by actuating the intake-side VVT mechanism toward the retardation side, it is possible to quickly actuate the VVT mechanism to the prescribed position as compared to actuating the intake-side VVT mechanism toward an advance side. Thus, it is possible to quickly start fail-safe control.

In the above control device, the intake-side VVT mechanism may be configured to be driven by an electric motor.

In the above control device, the intake-side VVT mechanism may be configured to be able to operate within a predetermined phase angle range, and the prescribed position may be a most retarded position in the phase angle range. With the above configuration, the intake-side VVT mechanism is pressed to a mechanically most retarded position with the force of the electric motor, so it is easy to prevent displacement of the intake-side VVT mechanism due to reaction for actuating the intake valve.

In the above control device, the controller may be configured to stop energization of the electric motor after the intake-side VVT mechanism is positioned at the most retarded position. With the above configuration, it is possible to contribute to reduction in electric power consumption during fail-safe control. When an engine rotation speed is low, fluctuations in reaction tend to be large due to the operation of the intake valve, so the intake-side VVT mechanism may be displaced.

In the above control device, the controller may be configured to, after the intake-side VVT mechanism is positioned at the most retarded position, stop energization of the electric motor when an engine rotation speed is higher than or equal to a predetermined value, and the controller may be configured to, after the intake-side VVT mechanism is positioned at the most retarded position, continue energization of the electric motor when the engine rotation speed is lower than the predetermined value.

In the above control device, the controller may be configured to, when it is determined that there is a failure in the crank position sensor and the intake-side VVT mechanism is actuated toward the retardation side, stop supplying fuel to the internal combustion engine until the intake-side VVT mechanism reaches the prescribed position. The cam phase is varying while the intake-side VVT mechanism is operating, so control based on the cam signal may be inaccurate. With the above configuration, it is possible to suppress influence on driving operation of the internal combustion engine.

In the above control device, the internal combustion engine may be mounted on a vehicle, and the fail-safe control may be control for allowing the vehicle to retreat.

In the above control device, timing at which the signal is generated from the cam position sensor may be set, in correspondence with timing at which fuel is injected to at least one cylinder during the fail-safe control or timing at which the at least one cylinder is ignited during the fail-safe control. With the above configuration, it is possible to immediately carry out fuel injection and ignition on the basis of the cam signal, so fail-safe control is simplified.

A second aspect of the invention provides a control method for an internal combustion engine. The control method includes: continuously advancing or retarding operation timing of an intake valve; and, when it is determined that there is a failure in a crank position sensor of the internal combustion engine, retarding the operation timing of the intake valve to a prescribed phase, and executing fail-safe control on the basis of a signal from a cam position sensor instead of a signal from the crank position sensor.

According to the invention, it is possible to execute accurate fail-safe control on the basis of the signal from the cam position sensor instead of the signal from the failed crank position sensor.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2A is a view that illustrates the schematic configuration of a cam position sensor according to the embodiment;

FIG. 2B is a graph that illustrates an internal voltage of the cam position sensor according to the embodiment;

FIG. 2C is a graph that illustrates a cam signal of the cam position sensor according to the embodiment;

DETAILED DESCRIPTION OF EMBODIMENTS

Hereinafter, an embodiment of the invention will be described with reference to the accompanying drawings.

Figure 1:
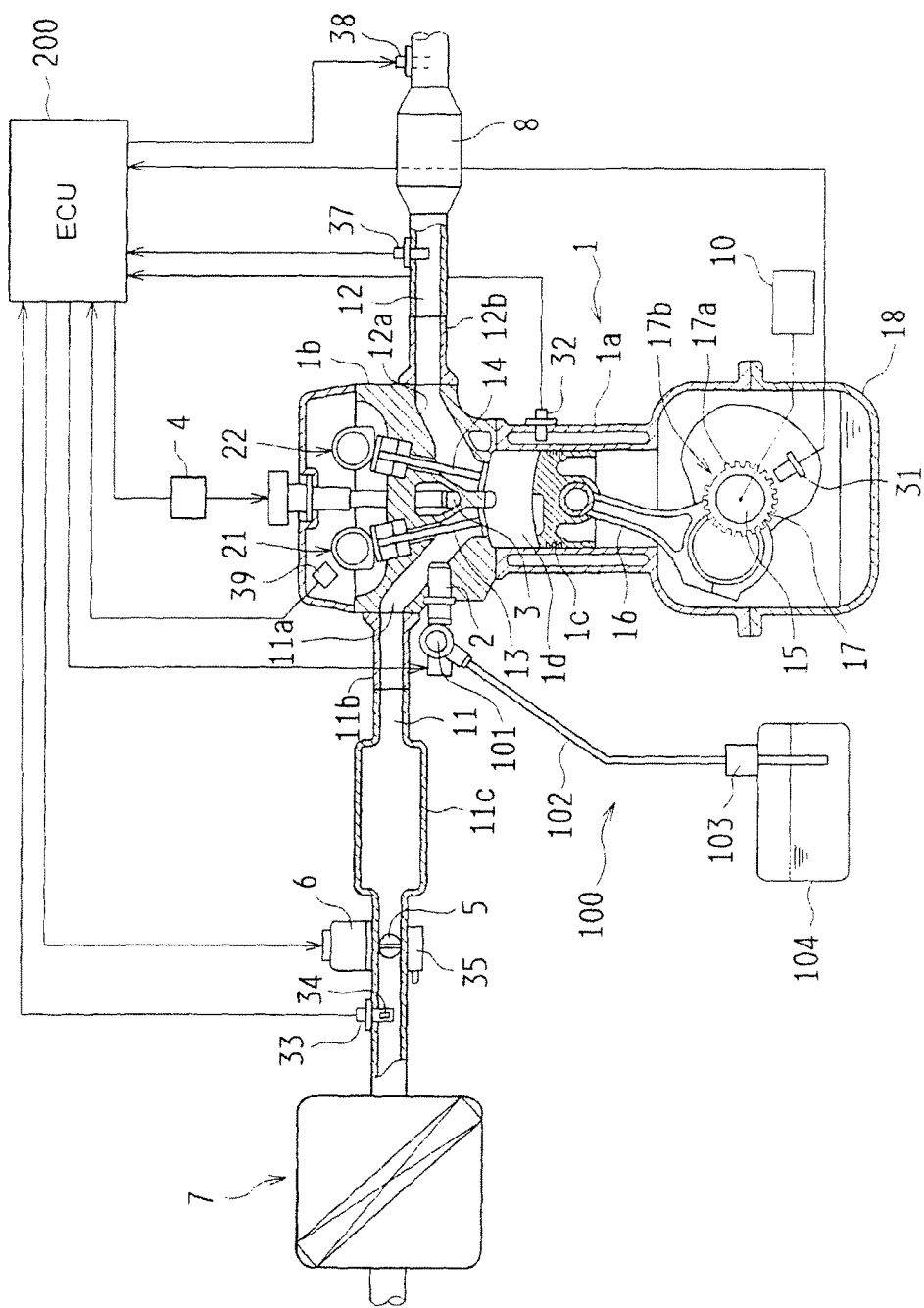
FIG. 1 is a schematic configuration view that shows an example of an internal combustion engine (engine) to which an embodiment of the invention is applied.

An internal combustion engine (hereinafter, also referred to as engine) according to the present embodiment will be described with reference to FIG. 1. The engine 1 shown in FIG. 1 is a four-cylinder gasoline engine mounted on a vehicle. In the engine 1, pistons 1c are respectively accommodated in four cylinders (only one cylinder is shown in FIG. 1) formed in a cylinder block 1a so as to reciprocally move up and down. A water jacket is formed in the cylinder block 1a so as to surround those four cylinders, and a coolant temperature sensor 32 is arranged so as to detect the temperature of engine coolant (coolant).

The reciprocal motions of the pistons 1c in the four cylinders each are converted to the rotational motion of a crankshaft 15 via a corresponding one of connecting rods 16. The crankshaft 15 is coupled to a transmission (not shown) via a torque converter (or a clutch), or the like, and is able to transmit the power of the engine 1 to drive wheels of the vehicle via the transmission. The transmission may be a multistage automatic transmission, a belt-type continuously variable transmission, or the like, as an example.

A starter motor 10 that is started at the time of starting the engine 1 is connected to the crankshaft 15. The crankshaft 15 can be forcibly rotated (cranked) by the starter motor 10. A signal rotor 17 is connected to the crankshaft 15. A plurality of teeth (protrusions) 17a are provided at the outer periphery of the signal rotor 17 at equal angular intervals, and a no-tooth portion 17b at which two of the teeth 17a are missing is also provided at the outer periphery.

A crank position sensor 31 is arranged laterally near the signal rotor 17. The crank position sensor 31 detects the rotation angle of the crankshaft 15, that is, a crank phase. The crank position sensor 31 is, for example, formed of an electromagnetic pickup. The crank position sensor 31 generates a pulse signal (hereinafter, referred to as crank signal) in response to passage of any one of the teeth 17a of the signal rotor 17 at the time when the crankshaft 15 rotates. It is possible to calculate an engine rotation speed Ne on the basis of the crank signal.

An oil pan 18 is provided at the lower portion of the cylinder block 1a so as to cover the crankshaft 15. The oil pan 18 stores lubricating oil (engine oil). Lubricating oil stored in the oil pan 18 is drawn by an oil pump (not shown) during operation of the engine 1. The drawn lubricating oil is supplied to various engine portions, such as the pistons 1c, the crankshaft 15 and the connecting rods 16, and is used to, for example, lubricate and cool those portions.

A cylinder head 1b is fastened to the upper end of the cylinder block 1a. A combustion chamber 1d is formed in each of the cylinders of which the upper ends are closed by the cylinder head 1b. Each combustion chamber 1d changes its volume with the reciprocal motion of the corresponding piston 1c. An ignition plug 3 is arranged for each cylinder at the cylinder head 1b so as to face the corresponding combustion chamber 1d, and the timing of ignition made by the ignition plug 3 is adjusted by an igniter 4. The igniters 4 are controlled by an electronic control unit (ECU) 200.

An intake passage 11 and an exhaust passage 12 both communicate with each of the combustion chambers 1d. The intake passage 11 introduces fresh air. The exhaust passage 12 emits burned gas. The downstream side (downstream side of intake air flow) of the intake passage 11 is formed of intake ports 11a and an intake manifold 11b, and a surge tank 11c is arranged at the upstream side of the intake passage 11. An air cleaner 7, a hot wire air flow meter 33, an intake air temperature sensor 34 (incorporated in the air flow meter as an example), a throttle valve 5, and the like, are arranged in the intake passage 11. The air cleaner 7 filters intake air. The throttle valve 5 is used to adjust the intake air amount of the engine 1.

As an example, the throttle valve 5 is provided on the upstream side of the surge tank 11c, and is driven by a throttle motor 6. The opening degree of the throttle valve 5 is detected by a throttle opening degree sensor 35, and is subjected to feedback control by the ECU 200 such that an optimal intake air amount based on the operating state of the engine 1 is obtained.

An injector (fuel injection valve) 2 is arranged in the corresponding intake port 11a for each cylinder. These injectors 2 are connected to a common delivery pipe 101, and fuel is supplied from a fuel supply system 100 to these injectors 2. As an example, the fuel supply system 100 includes a fuel supply tube 102, a fuel pump 103, a fuel tank 104, and the like. The fuel supply tube 102 is connected to the delivery pipe 101.

The injectors 2 are controlled by the ECU 200, and fuel is injected and supplied for each cylinder. Fuel injected from the injector 2 into the corresponding intake port 11a is mixed with intake air, and is introduced to the corresponding combustion chamber 1d in the cylinder as a corresponding intake valve 13 opens. The air-fuel mixture is ignited by the corresponding ignition plug 3 to combust and explode at the last phase of compression stroke of the cylinder, high-temperature and high-pressure burned gas pushes the corresponding piston 1c downward and is then emitted to the exhaust passage 12 as a corresponding exhaust valve 14 opens.

The upstream side (upstream side of exhaust gas flow) of the exhaust passage 12 is formed of exhaust ports 12a and an exhaust manifold 12b, and a three-way catalyst 8 is arranged at the downstream side of the exhaust passage 12. The three-way catalyst 8 purifies exhaust gas by oxidizing CO and HC and reducing NOx in exhaust gas emitted to the exhaust passage 12 and converting them to $CO_2$, $H_2O$, $N_2$.

A front air-fuel ratio sensor 37 is, for example, arranged in the exhaust passage 12 on the upstream side of the three-way catalyst 8. The front air-fuel ratio sensor 37 indicates a linear characteristic for an air-fuel ratio. A rear $O_2$ sensor 38 is, for example, arranged in the exhaust passage 12 on the downstream side of the three-way catalyst 8. The rear $O_2$ sensor 38 is formed of a lambda sensor. Output signals of these front air-fuel ratio sensor 37 and rear $O_2$ sensor 38 are fed back to the ECU 200, and are served in control over the air-fuel ratio.

The above-described introduction and emission of each combustion chamber 1d are carried out through open/close operations of the corresponding intake valve 13 and the corresponding exhaust valve 14. That is, the intake valve 13 is provided between each intake port 11a and a corresponding one of the combustion chambers 1d, and the exhaust valve 14 is provided between each exhaust port 12a and a corresponding one of the combustion chambers 1d. The intake valves 13 are respectively opened or closed at predetermined timings by an intake camshaft 21 that is rotated by the crankshaft 15 via a chain (not shown), or the like. The exhaust valves 14 are respectively opened or closed at predetermined timings by an exhaust camshaft 22 that is rotated by the crankshaft 15 via the chain (not shown), or the like.

More specifically, each of the intake and exhaust camshafts 21, 22 rotates at a rotation speed that is half of the rotation speed of the crankshaft 15, and makes one rotation while each of the pistons 1c reciprocates twice. In other words, while the crankshaft 15 makes two rotations (720° rotation), each piston 1c carries out intake, compression, expansion and exhaust strokes, each of the camshafts 21, 22 makes one rotation, each intake valve 13 is opened in the intake stroke of the corresponding cylinder, and each exhaust valve 14 is opened in the exhaust stroke of the corresponding cylinder.

A cam position sensor 39 is provided near the intake camshaft 21 that rotates in this way. The cam position sensor 39 generates a cam signal in order to detect the phase of the intake camshaft 21 (that is, the phase of a cam that actuates the intake valves 13) with respect to the rotation angle of the intake camshaft 21, that is, a crank phase. Specifically, as schematically shown in FIG. 2A, a timing rotor 23 is connected to the intake camshaft 21, and a plurality of (three in the example of the drawing) protruding portions 23a to 23c are formed at its outer peripheral portion.

The cam position sensor 39 according to the present embodiment is a so-called magneto resistive element (MRE) sensor, and includes a magnet 39a and a waveform shaping circuit 39b formed of an IC. As the three protruding portions 23a to 23c respectively pass near the cam position sensor 39 with rotation of the timing rotor 23, a magnetic field varies, and an internal voltage varies as shown in FIG. 2B. The variation in the internal voltage is shaped into a rectangular wave by the waveform shaping circuit 39b, and high (Hi) and low (Lo) digital signals are output as shown in FIG. 2C.

As an example, the first protruding portion 23a of the timing rotor 23 is formed over 90°, the second protruding portion 23b is formed at an interval of 30° from the first protruding portion 23a and is formed over 60°, and the third protruding portion 23c is formed at an interval of 60° from the second protruding portion 23b and is formed over 30°. The interval between the third protruding portion 23c and the first protruding portion 23a is set to 90°. A Hi signal is output from the cam position sensor 39 in a period corresponding to the rotation angle of the timing rotor 23 (that is, cam angle) with passage of those first to third protruding portions 23a to 23c.

As described above, one rotation of the intake camshaft 21 corresponds to two rotations of the crankshaft 15, so the cam signal becomes Hi in a period of 180° in the rotation angle of the crankshaft 15 (crank angle) in correspondence with passage of the first protruding portion 23a. Subsequently, the cam signal becomes Lo in a period of 60° in the crank angle at a portion of the interval between the first and second protruding portions 23a, 23b, and becomes Hi in a period of 120° in the crank angle in correspondence with passage of the second protruding portion 23b. In this way, the cam signal is repeatedly inverted between Hi and Lo.

It is possible to detect the rotation angle of the timing rotor 23, that is, the cam angle, through pattern recognition of such inversion of the cam signal between Hi and Lo, and fuel injection control, ignition control, VVT control, and the like, (described later) are executed on the basis of the cam angle and the crank signal (crank angle). In the present embodiment, inversion (Lo to Hi) of the signal resulting from a start of passage of the first protruding portion 23a corresponds to a compression top dead center (TDC) of a predetermined cylinder (for example, first cylinder) as will be described later. Hereinafter, the cam signal is also inverted at the TDC of each of the cylinders in the ignition order (third cylinder, fourth cylinder, second cylinder).

In the present embodiment, an electric variable valve timing mechanism (hereinafter, referred to as VVT mechanism 40) described below is installed at the intake camshaft 21. Thus, it is possible to continuously advance or retard the rotation phase (cam phase) of the intake camshaft 21. Thus, the timing at which each of the intake valves 13 opens or closes (hereinafter, also referred to as intake valve timing) is continuously advanced or retarded.

Figure 3:
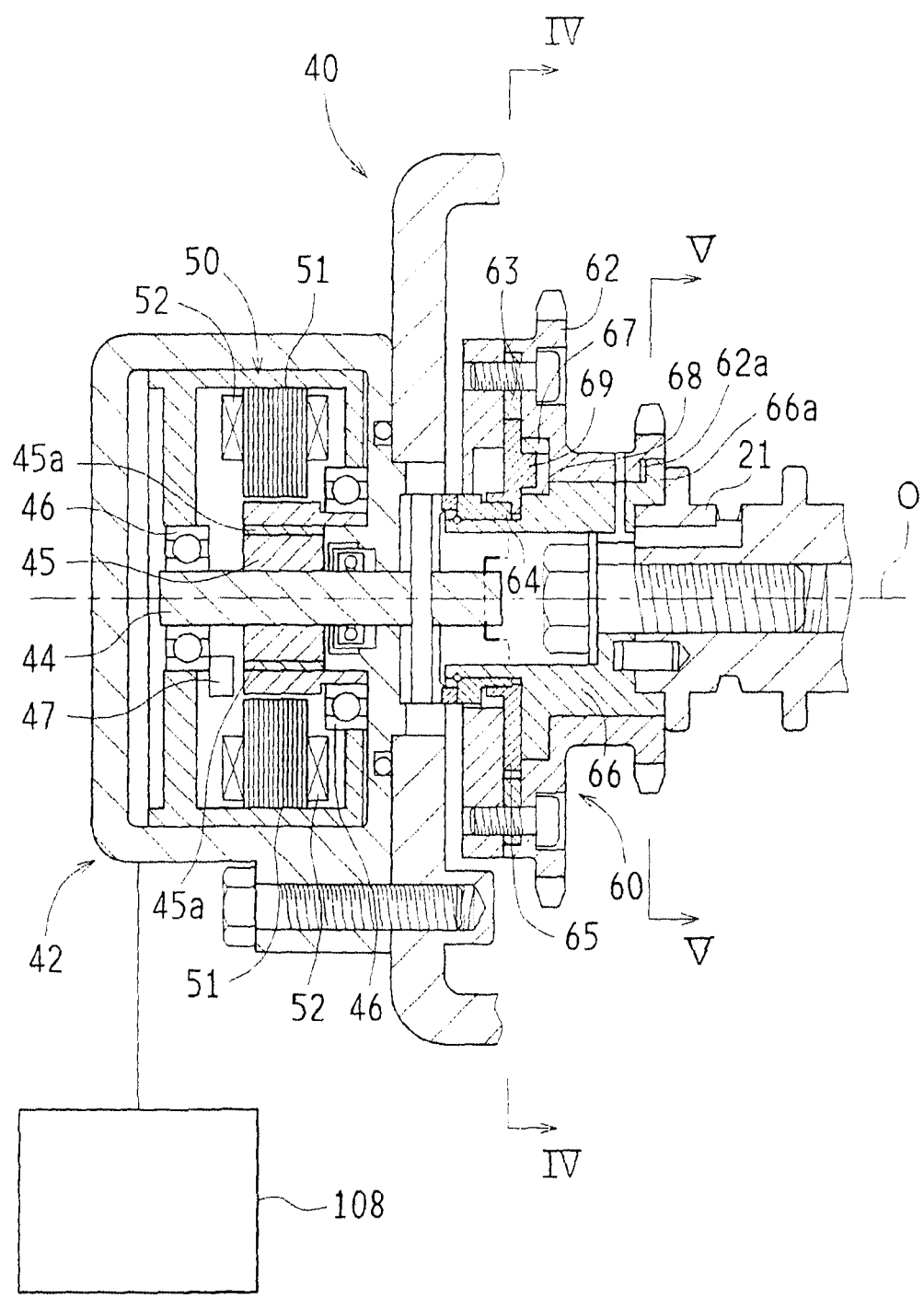
FIG. 3 is a cross-sectional view that shows the configuration of a VVT mechanism according to the embodiment.
Figure 4:
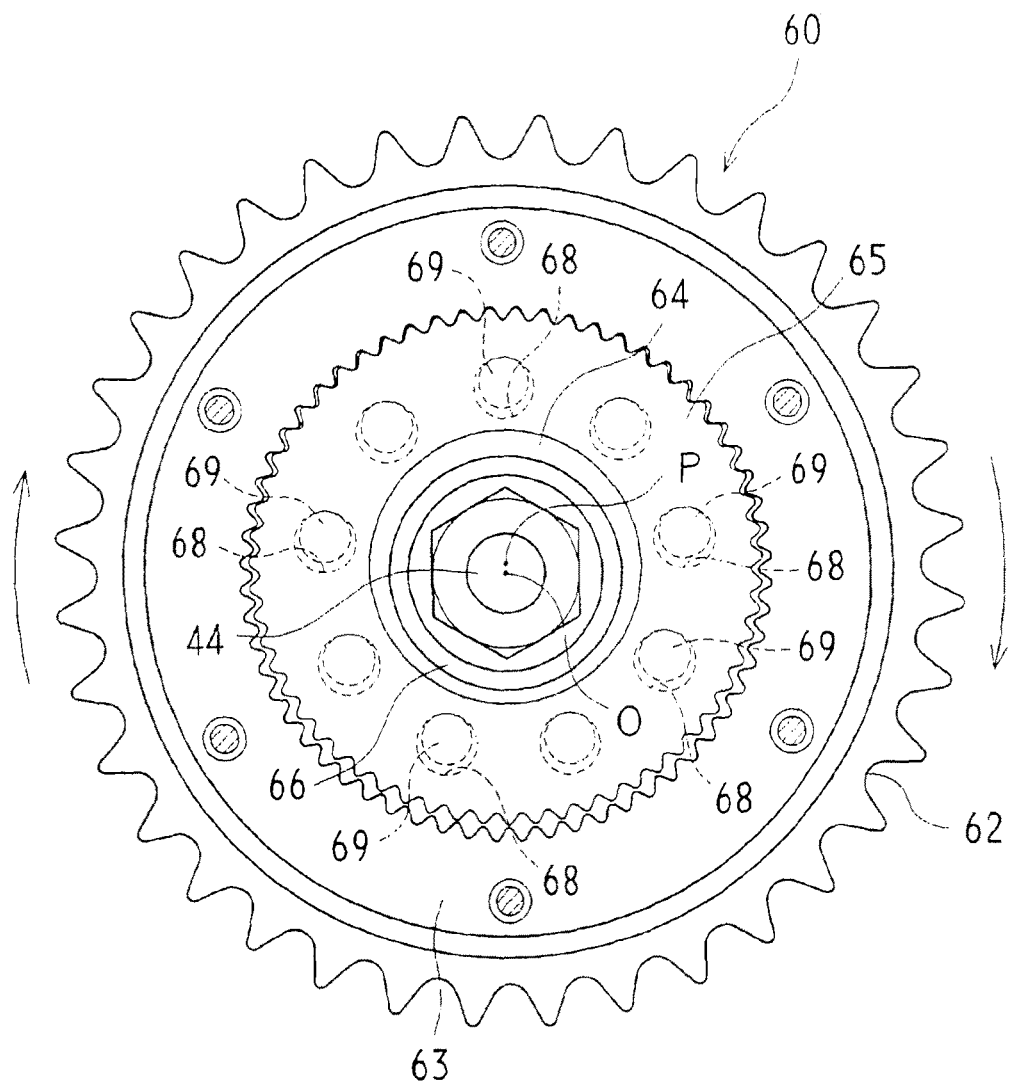
FIG. 4 is a cross-sectional view taken along the line IV-IV in FIG. 3.
Figure 5:
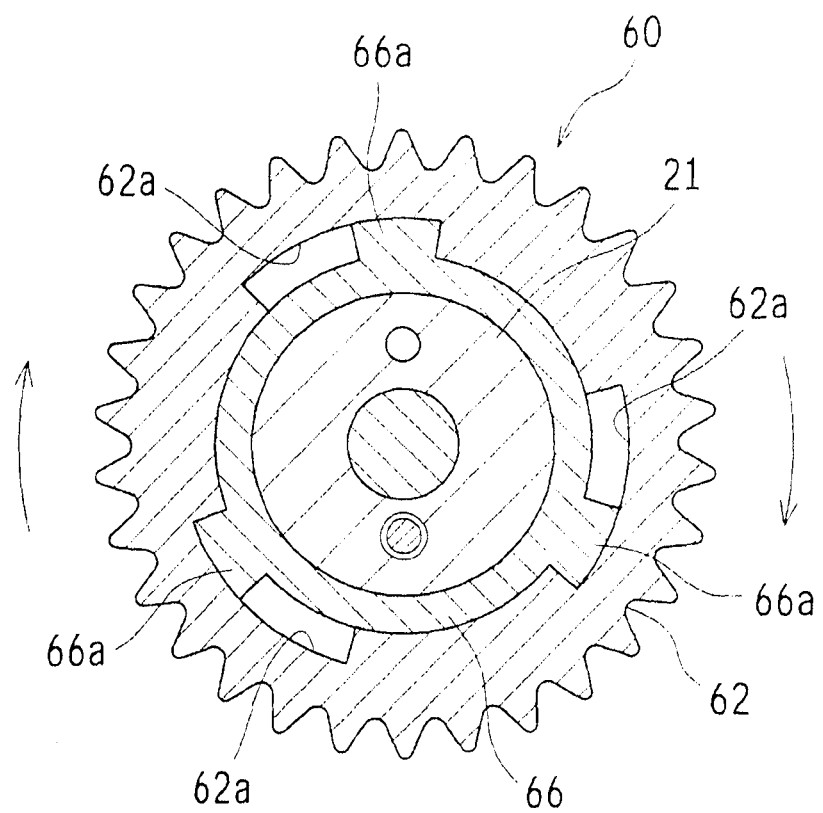
FIG. 5 is a cross-sectional view taken along the line V-V in FIG. 3.

As shown in FIG. 3 to FIG. 5, in the present embodiment, the VVT mechanism 40 (not shown in FIG. 1) is arranged at the end portion of the intake camshaft 21. FIG. 3 is a cross-sectional view that shows the internal structure of the VVT mechanism 40. FIG. 4 is a cross-sectional view taken along the line IV-IV in FIG. 3. FIG. 5 is a cross-sectional view taken along the line V-V in FIG. 3. Not only the VVT mechanism 40 is arranged at the intake camshaft 21 but also a VVT mechanism having a similar structure may be arranged at the exhaust camshaft 22.

In the example of the drawings, the VVT mechanism 40 is driven by an electric motor 42 that is controlled by the ECU 200, and, as shown in FIG. 3, the electric motor 42 is a three-phase motor formed of a motor shaft 44, bearings 46, a rotation speed sensor 47, a stator 50, and the like. The motor shaft 44 is supported by the two bearings 46, and is rotatable around an axis O. A disc-shaped rotor portion 45 is fixed to the motor shaft 44. The rotor portion 45 protrudes radially outward. A plurality of magnets 45a are embedded in the outer peripheral wall of the rotor portion 45.

The stator 50 is arranged on the outer peripheral side of the motor shaft 44, and includes a plurality of coils arranged at equal intervals around the axis O of the motor shaft 44. Coils are formed by winding wires 52 on a core 51. When the coils receive current supplied from a drive circuit 108 and the current flows through the coils, the coils form revolving magnetic fields on the outer peripheral side of the motor shaft 44 and generate rotation torque. The rotation speed sensor 47 is arranged near the rotor portion 45, and detects the rotation speed of the motor shaft 44 by sensing the strength of the magnetic field formed by each of the magnets 45a.

Other than FIG. 3, as shown in FIG. 4, the VVT mechanism 40 includes a phase variation mechanism 60 that varies the phase angle of the intake camshaft 21. The phase variation mechanism 60 includes a sprocket 62, a ring gear 63, an eccentric shaft 64, a planetary gear 65, an output shaft 66, and the like. The sprocket 62 is coaxially arranged on the outer peripheral side of the output shaft 66. The sprocket 62 is relatively rotatable with respect to the output shaft 66 around the axis O that is the same as that of the motor shaft 44, and is drivably coupled to the crankshaft 15 by the chain (not shown), or the like. The ring gear 63 is coaxially fixed to the inner peripheral wall of the sprocket 62, and integrally rotates with the sprocket 62.

The eccentric shaft 64 is fixedly coupled to the motor shaft 44 in a state where the eccentric shaft 64 is offset from the axis O. The planetary gear 65 formed of an external gear is relatively rotatably supported by the eccentric shaft 64, and is rotatable around an eccentric axis P. The planetary gear 65 is in mesh with the ring gear 63, and makes sun-and-planet motion on the inner peripheral side of the ring gear 63 while rotating around the eccentric shaft 64 through rotation of the motor shaft 44.

The output shaft 66 is fixedly bolted to the intake camshaft 21 so as to integrally rotate with the intake camshaft 21. An annular plate-shaped engaging portion 67 having a center that coincides, with the axis O is formed in the output shaft 66, and a plurality of engaging holes 68 are provided in the engaging portion 67 at equal intervals in the circumferential direction. A plurality of engaging protrusions 69 are formed in the planetary gear 65 in correspondence with these engaging holes 68. The engaging protrusions 69 are respectively loosely inserted in the corresponding engaging holes 68.

In the thus structured VVT mechanism 40, rotation of the crankshaft 15 is transmitted to the sprocket 62 by the chain, or the like, and the sprocket 62 rotates in the clockwise direction (indicated by the arrow) in FIG. 4 while keeping the rotation phase with respect to the crankshaft 15. When the motor shaft 44 does not relatively rotate with respect to the sprocket 62, the planetary gear 65 rotates integrally with rotation of the sprocket 62 in the clockwise direction in FIG. 4 while keeping a meshed position with the ring gear 63.

At this time, the plurality of engaging protrusions 69 of the planetary gear 65 press the inner peripheral walls in the corresponding engaging holes 68 in the rotation direction, so the engaging portion 67 of the output shaft 66 is pressed in the rotation direction, and the output shaft 66 rotates in the clockwise direction in FIG. 4 without relatively rotating with respect to the sprocket 62. Thus, the rotation phase of the output shaft 66 with respect to the sprocket 62, in other words, the rotation phase of the intake camshaft 21 with respect to the crankshaft 15, is kept.

On the other hand, when the motor shaft 44 relatively rotates in the counterclockwise direction in FIG. 4 with respect to the sprocket 62, the planetary gear 65 varies the meshed position with the ring gear 63 while relatively rotating in the clockwise direction in FIG. 4 with respect to the eccentric shaft 64 through the sun-and-planet motion. At this time, force by which the engaging protrusions 69 press the engaging holes 68 in the rotation direction increases, so the output shaft 66 pivots toward an advance side with respect to the sprocket 62. That is, the VVT mechanism 40 is actuated toward the advance side, and the cam phase is advanced.

Conversely, when the motor shaft 44 relatively rotates in the clockwise direction in FIG. 4 with respect to the sprocket 62, the planetary gear 65 varies the meshed position with the ring gear 63 while relatively rotating in the counterclockwise direction of FIG. 4 with respect to the eccentric shaft 64 through the sun-and-planet motion. At this time, the engaging protrusions 69 press the engaging holes 68 in the counterclockwise direction, so the output shaft 66 pivots toward a retardation side with respect to the sprocket 62. That is, the VVT mechanism 40 is actuated toward the retardation side, and the cam phase is retarded.

Such operation of the VVT mechanism 40 toward the advance side or the retardation side is restricted to a predetermined phase angle range due to the structure of the phase variation mechanism 60. That is, as shown in FIG. 5, a plurality of (three in the example of the drawing) stopper groove portions 62a are formed in the sprocket 62. The plurality of stopper groove portions 62a are open at the inner periphery that slides on the outer periphery of the output shaft 66, and each extend in the circumferential direction over a predetermined angular range. A plurality of stopper protrusions 66a formed at the outer periphery of the output shaft 66 in correspondence with the stopper groove portions 62a are inserted in the stopper groove portions 62a, and are relatively movable in the circumferential direction.

With the above configuration, the sprocket 62 and the output shaft 66 are relatively pivotable with respect to each other in an angular range in which the stopper protrusions 66a are relatively movable in the stopper groove portions 62a. FIG. 5 shows a state where the stopper protrusions 66a are in contact with the circumferential one end portions of the corresponding stopper groove portions 62a. At this time, the output shaft 66 is located at a most advanced position with respect to the sprocket 62, and the phase of the intake camshaft 21 is a most advanced phase.

Although not shown in the drawing, when the output shaft 66 pivots in the counterclockwise direction in FIG. 5 (direction opposite to the arrow) with respect to the sprocket 62 and then the stopper protrusions 66a contact the circumferential other end portions of the corresponding stopper groove portions 62a, the output shaft 66 is located at a most retarded position with respect to the sprocket 62. At this time, the phase of the intake camshaft 21 is a most retarded phase.

Figure 6:
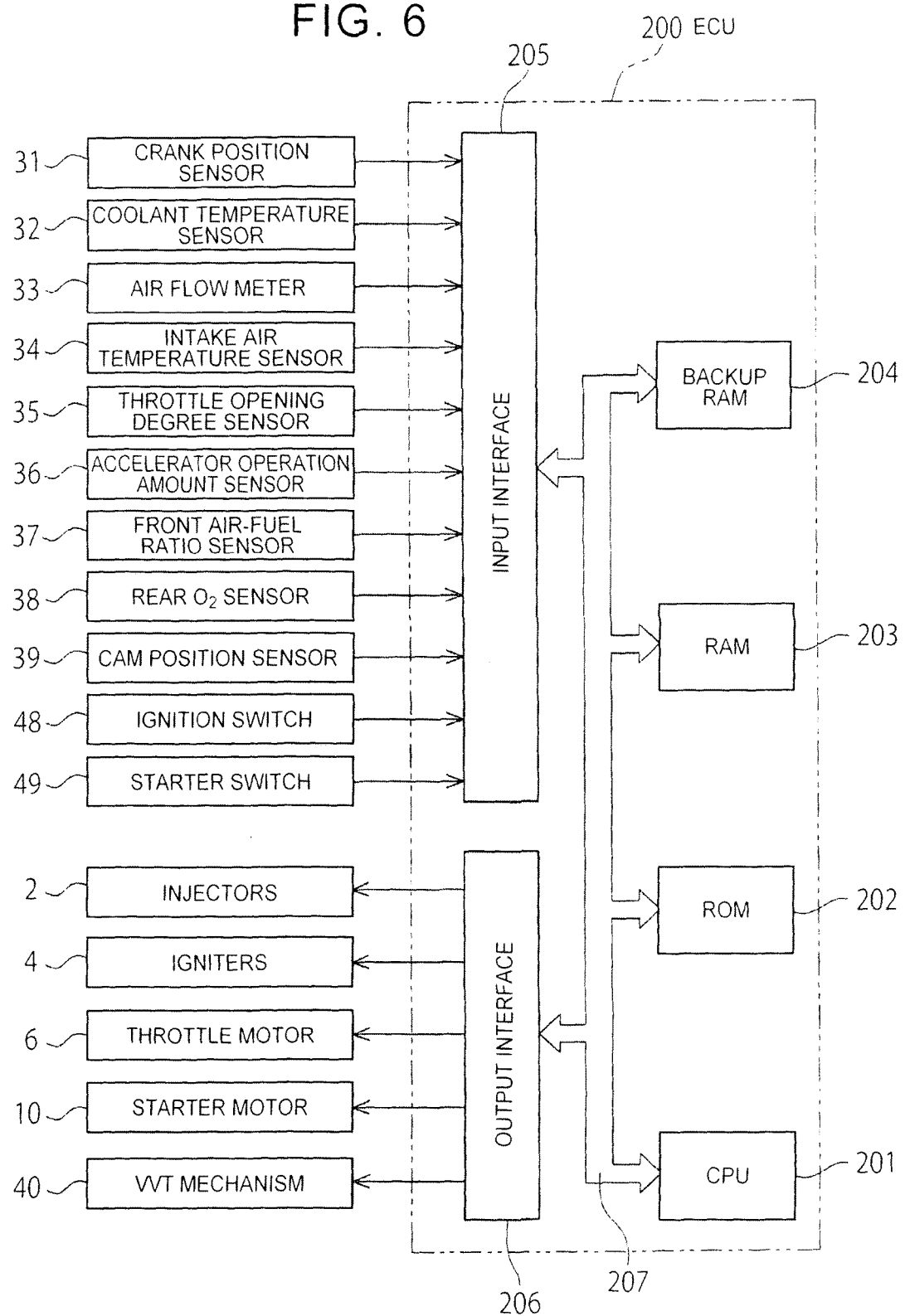
FIG. 6 is a block diagram that shows the configuration of a control system for the engine according to the embodiment.

As shown in FIG. 6, the ECU 200 includes a central processing unit (CPU) 201, a read only memory (ROM) 202, a random access memory (RAM) 203, a backup RAM 204, and the like.

The ROM 202 stores various control programs, maps consulted at the time when those various control programs are executed, and the like. The CPU 201 executes various arithmetic processings on the basis of the various control programs and maps stored in the ROM 202. The RAM 203 is a memory that temporarily stores results computed by the CPU 201, data input from the sensors, and the like. The backup RAM 204 is a nonvolatile memory that stores data, and the like, to be saved at the time of, for example, a stop of the engine 1.

The above-described CPU 201, ROM 202, RAM 203 and backup RAM 204 are connected to one another via a bus 207, and are connected to an input interface 205 and an output interface 206.

Various sensors are connected to the input interface 205. The various sensors include the crank position sensor 31, the coolant temperature sensor 32, the air flow meter 33, the intake air temperature sensor 34, the throttle opening degree sensor 35, an accelerator operation amount sensor 36, the front air-fuel ratio sensor 37, the rear $O_2$ sensor 38, the cam position sensor 39, and the like. The accelerator operation amount sensor 36 outputs a detected signal corresponding to a depression amount of an accelerator pedal.

An ignition switch 48 and a starter switch 49 are connected to the input interface 205. The ignition switch 48 turns on or off a main power supply of the vehicle. The starter switch 49 is operated by an occupant of the vehicle in association with a start of the engine 1. When the ignition switch 48 is turned on, control over the engine 1 is started by the ECU 200. When the starter switch 49 is turned on, cranking of the engine 1 is started by the starter motor 10.

As an example, the injectors 2 of the respective cylinders, similarly, the igniters 4 of the ignition, plugs 3 of the respective cylinders, the throttle motor 6 of the throttle valve 5, the starter motor 10, the VVT mechanism 40 of the intake camshaft 21, and the like, are connected to the output interface 206.

The ECU 200 executes various controls over the engine 1 on the basis of signals from the above-described various sensors and switches. The various controls include drive control over the injectors 2 (control over the fuel injection amount and fuel injection timing), control over the ignition timing of each ignition plug 3, drive control over the throttle motor 6 (control over the throttle opening degree), control over the VVT mechanism 40, and the like. For example, the ECU 200 causes each injector 2 to inject fuel and causes each ignition plug 3 to carry out ignition at appropriate timing for each cylinder on the basis of the crank signal and the cam signal.

The throttle opening degree is controlled on the basis of the signal from the accelerator operation amount sensor 36 and the engine rotation speed Ne. The VVT mechanism 40 is controlled on the basis of the crank signal and the cam signal such that the calculated phase of the intake camshaft 21 becomes appropriate on the basis of the operating state of the engine 1, and the like (that is, appropriate intake valve timing).

As will be described below, when there occurs a failure in the crank position sensor 31, the ECU 200 executes fail-safe control for fuel injection control, ignition control, throttle opening degree control, VVT control, and the like, on the basis of the cam signal instead of the crank signal in order to allow the vehicle to retreat. That is, the control device for an internal combustion engine according to the present embodiment is implemented by a program associated with the following fail-safe control that is executed by the ECU 200.

Next, fail-safe control in the present embodiment will be described. In the above-described engine 1, for example, when the crank signal is no longer input due to a failure, such as a broken wire in the crank position sensor 31, it is conceivable to utilize the cam signal instead. It is possible to substantially calculate the engine rotation speed Ne from the cam signal, so it is conceivable that control over the throttle opening degree can be executed with a desired accuracy.

However, when the VVT mechanism 40 is provided at the intake camshaft 21 as in the case of the present embodiment, the VVT mechanism 40 may be, for example, displaced upon reception of reaction for actuating the intake valves 13. Therefore, in cases when the phase of the intake camshaft 21 deviates from the crank phase, there would be no way to determine the deviation from the crank phase unless they crank signal is obtained.

Figure 7:
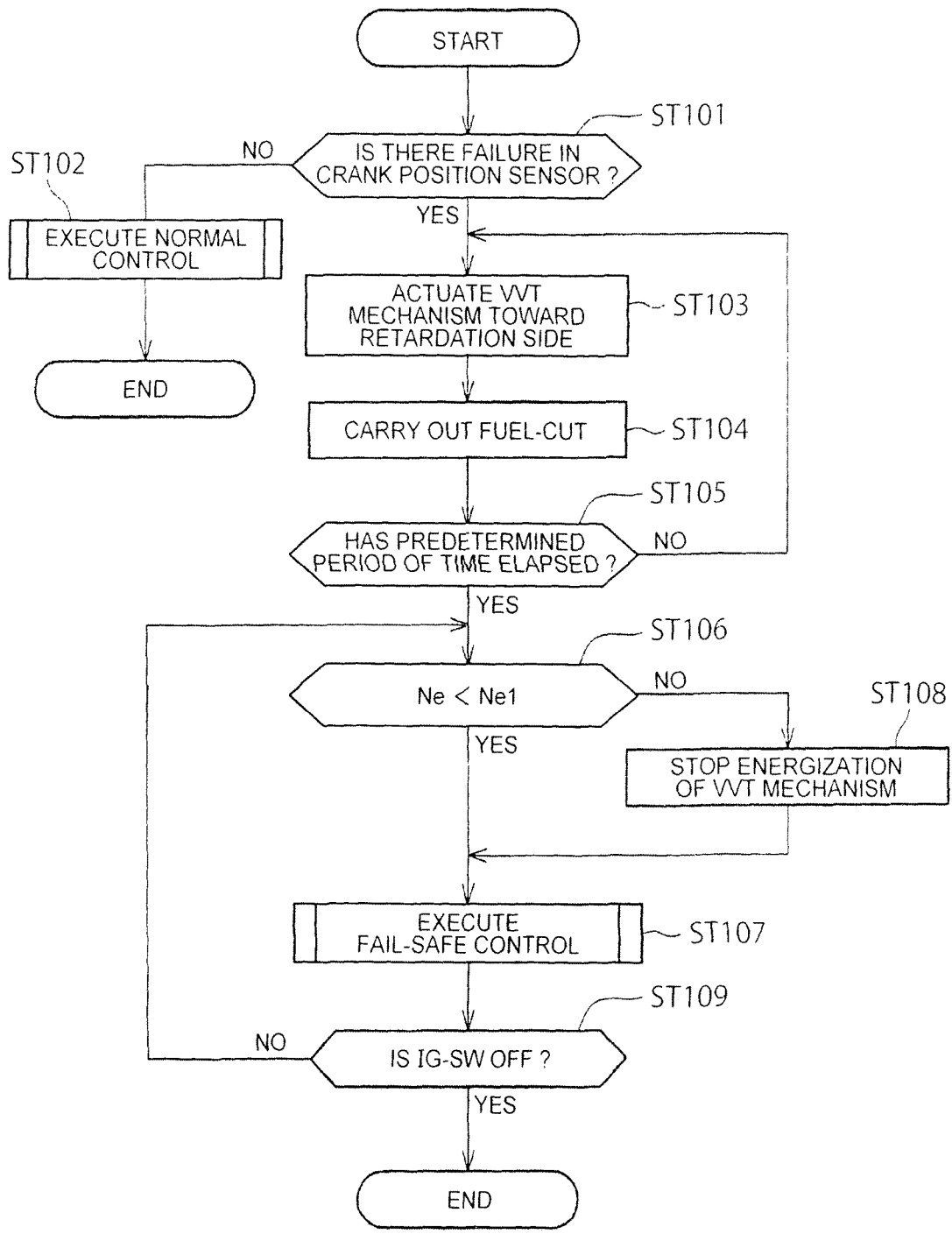
FIG. 7 is a flowchart that shows an example of fail-safe control according to the embodiment.

In the present embodiment, when it is determined that there is a failure in the crank position sensor 31, the VVT mechanism 40 is immediately actuated to the most retarded position, and then fail-safe control is executed by utilizing the cam signal. Hereinafter, an example of fail-safe control will be described with reference to the flowchart shown in FIG. 7. The control routine is repeatedly executed by the ECU 200 at predetermined time intervals (for example, 50 milliseconds) during operation of the engine 1.

Initially, in step ST101 after the start, the ECU 200 determines whether there is a failure in the crank position sensor 31 on the basis of the input crank signal. When the crank signal is input without having a time interval longer than or equal to a predetermined time and the ECU 200 makes negative determination that there is no failure in the crank position sensor 31 in step ST101 (NO), the ECU 200 proceeds with the process to step ST102. The ECU 200 executes normal fuel injection control, ignition control, throttle opening degree control, VVT control, and the like, as described above in step ST102.

On the other hand, for example, when the crank signal is not input for the predetermined period of time or longer and the ECU 200 makes affirmative determination that there is a failure, such as a broke wire, in step ST101 (YES), the ECU 200 proceeds with the process to step ST103. In step ST103, the ECU 200 forcibly actuates the VVT mechanism 40 toward the retardation side by outputting a control signal to the electric motor 42 of the VVT mechanism 40. In step ST104, the ECU 200 forcibly stops the operation of the injectors 2 to stop injecting and supplying fuel to the cylinders, and also stops energization of the ignition plugs 3.

By actuating the VVT mechanism 40 with the use of the electric motor 42 in this way, it is possible to position the VVT mechanism 40 at the most retarded position as quickly as possible. That is, the sprocket 62 receives rotation force toward the advance side from the chain, or the like, so the VVT mechanism 40 is actuated toward the retardation side voluntarily when energization of the electric motor 42 is stopped; however, the VVT mechanism 40 is actively actuated toward the retardation side by the electric motor 42 in order to further quickly position the VVT mechanism 40 at the most retarded position.

The ECU 200 determines in step ST105 whether the predetermined period of time has elapsed from when the VVT mechanism 40 starts to be actuated toward the retardation side as described above. When the predetermined period of time has not elapsed, the ECU 200 makes negative determination (NO), and returns the process to step ST103. On the other hand, when the predetermined period of time has elapsed and the ECU 200 makes affirmative determination (YES), the ECU 200 proceeds with the process to step ST106. In this case, the predetermined period of time may be set to a period of time (for example, 500 milliseconds) required to actuate the VVT mechanism 40 from the most advanced position to the most retarded position at the time when the VVT mechanism 40 is actuated toward the retardation side by the electric motor 42 as described above.

When the predetermined period of time has elapsed, the VVT mechanism 40 is at the most retarded position. Therefore, the ECU 200 determines in step ST106 whether the engine rotation speed Ne (the engine rotation speed Ne at the timing at which it is determined that there is a failure in the crank position sensor 31) is lower than a preset threshold Ne1. When affirmative determination is made in step ST106 (YES), the ECU 200 proceeds with the process to step ST107. On the other hand, when negative determination is made in step ST106 (NO), the ECU 200 proceeds with the process to step ST108. The ECU 200 stops energization of the electric motor 42 of the VVT mechanism 40 in step ST108, and then proceeds with the process to step ST107.

That is, when the engine rotation speed Ne is low, fluctuations in reaction received by the intake camshaft 21 tend to increase, and the VVT mechanism 40 may be displaced from the most retarded position, so energization of the electric motor 42 is continued. On the other hand, when the engine rotation speed Ne is higher than or equal to the predetermined rotation speed Ne1, electric power consumption is reduced by stopping energization of the electric motor 42.

In step ST107, the ECU 200 executes fail-safe control on the basis of the cam signal instead of the crank signal. This control is to allow the vehicle to retreat, and large power of the engine 1 is not required, so, for example, the throttle opening degree may be limited to about 60 to 70% irrespective of the signal from the accelerator operation amount sensor 36. The fuel injection amount is controlled such that a target air-fuel ratio is obtained on the basis of the intake air amount as in the case of normal control, and the injection timing is, for example, controlled to timing in the expansion stroke to the exhaust stroke for each cylinder.

The ignition timing just needs to be set to the compression top dead center (TDC) of each cylinder such that combustion stability is easily ensured even when the engine is cold. In the present embodiment, the cam signal is inverted at the TDC of each cylinder as described above, so it is possible to directly control the ignition timing accordingly. The engine rotation speed Ne used in control over the throttle opening degree, or the like, may be calculated from the cam signal.

While the engine 1 is operated to allow the vehicle to retreat in this way, the ECU 200 determines in step ST109 whether the ignition switch 48 is turned off (IG-SW OFF ?). When negative determination is made in step ST109 (NO), the ECU 200 returns the process to step ST106 (the engine rotation speed Ne is calculated from the cam signal). On the other hand, when the ignition switch 48 is turned off, the ECU 200 makes affirmative determination in step ST109 (YES), and ends the fail-safe control routine (END).

Figure 8:
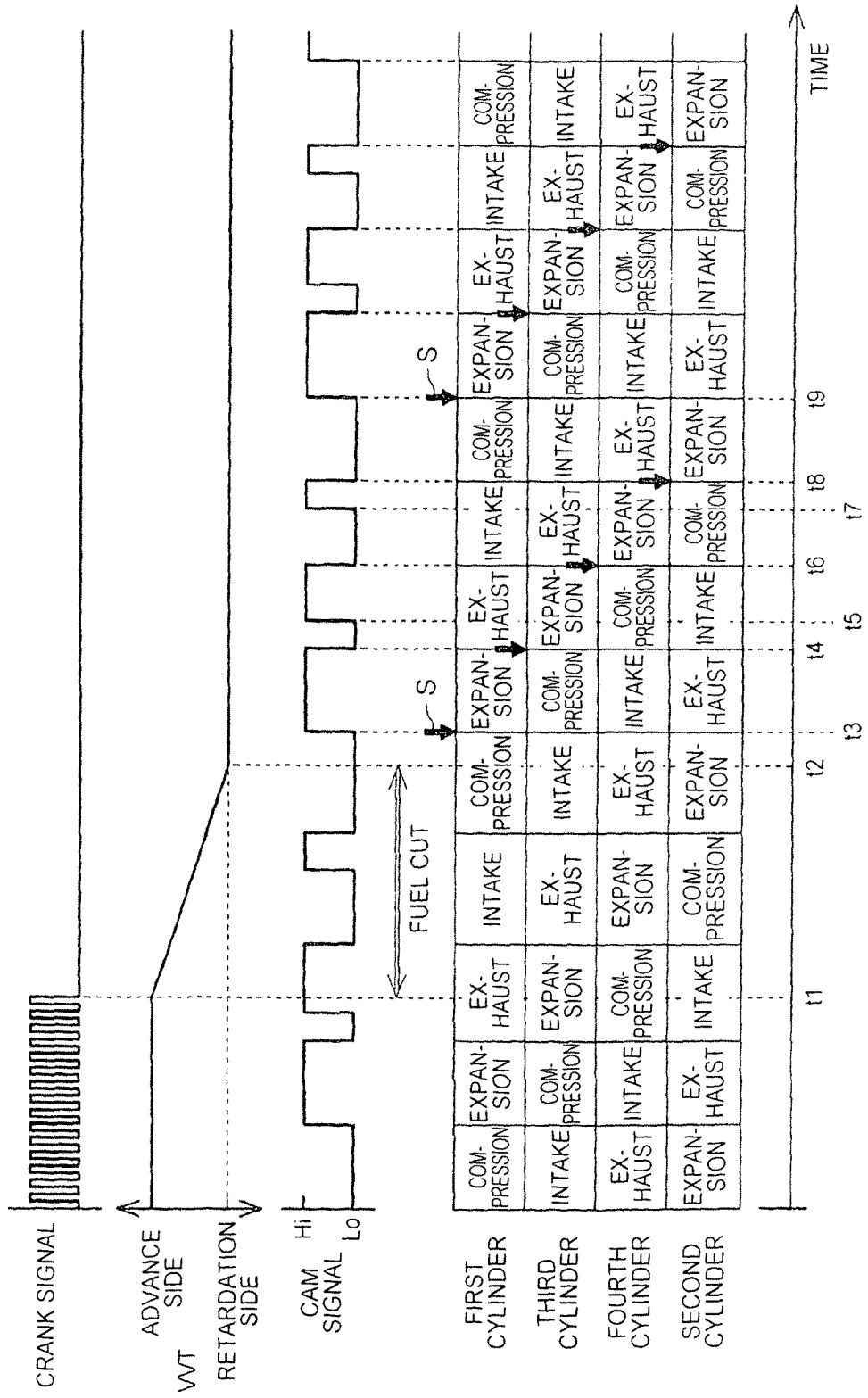
FIG. 8 is a timing chart that shows a correlation among the operation of the VVT mechanism and the cam signal through fail-safe control, fuel injection and ignition timing, and the like, of each cylinder according to the embodiment.

Thus, with the control device for the engine 1 according to the present embodiment, as shown in FIG. 8 as an example, when there occurs a failure in the crank position sensor 31 during operation of the engine 1 and then the crank signal is lost (time t1), the VVT mechanism 40 immediately starts to be actuated toward the retardation side, and fuel injection carried out by the injectors 2 and ignition control carried out by the ignition plugs 3 are stopped (fuel cut). That is, while the cam phase is varying through retardation operation of the VVT mechanism 40, controls that can be inaccurate due to the variation in the cam phase are temporarily stopped.

The VVT mechanism 40 is actively actuated toward the retardation side by the electric motor 42 and quickly positioned at the most retarded position (time t2), and then control over fuel injection, ignition, and the like, is resumed. When the VVT mechanism 40 reaches the most retarded position, the stopper protrusions 66a of the output shaft 66 contact the circumferential other end portions of the stopper groove portions 62a of the sprocket 62 in the phase variation mechanism 60. When energization of the electric motor 42 is continued in this state, it is possible to suppress a variation in the position of the VVT mechanism 40 even when the VVT mechanism 40 receives reaction from the intake valves 13.

By pressing the VVT mechanism 40 to the most retarded position with the force of the electric motor 42 in this way, it is possible to keep the VVT mechanism 40 at the most retarded position, and the phase of the intake camshaft 21 does not vary. Therefore, it is possible to accurately execute fail-safe control using the cam signal instead of the crank signal. As an example, the first cylinder at the compression TDC is ignited at the leading edge (Lo to Hi) of the cam signal at time t3 in FIG. 8 (indicated by the arrow S).

Subsequently, at time t4 at which the cam signal is inverted (Hi to Lo), the third cylinder at the compression TDC is ignited, and fuel is injected to the second cylinder at the exhaust BDC. After that, fuel is injected to the first cylinder in the exhaust stroke at time t5 at which the cam signal is inverted, and then the fourth cylinder at the compression TDC is ignited at time t6 at which the cam signal is inverted. Subsequently, fuel is injected to the third cylinder in the exhaust stroke at time t7 at which the cam signal is inverted, and then, at time t8 at which the cam signal is inverted, the second cylinder at the compression TDC is ignited, and fuel is injected to the fourth cylinder at the exhaust BDC.

Subsequently, at time t9 at which the cam signal is inverted, the first cylinder at the compression TDC is ignited again, and fuel is injected to the second cylinder at the exhaust BDC. After that, fuel injection and ignition control are carried out similarly in order of the first cylinder, the third cylinder, the fourth cylinder and the second cylinder. In this way, it is possible to directly carry out fuel injection and ignition control over the first to fourth cylinders in response to inversion of the cam signal, so a process, such as a timer count, is not required, and control is simplified.

The embodiment of the invention is described above; however, the above-described embodiment is only illustrative, and does not intend to limit the configuration, application, and the like, of the invention. For example, in the above-described embodiment, when it is determined that there is a failure in the crank position sensor 31, fail-safe control is executed by positioning the VVT mechanism 40 at the most retarded position; however, it is not limited to the configuration that the VVT mechanism 40 is positioned at the most retarded position. The VVT mechanism 40 may be positioned at an intermediate position between the most advanced position and the most retarded position. However, it is desirable to position the VVT mechanism 40 at a position at which the operation of the VVT mechanism is mechanically restricted.

When the VVT mechanism is arranged not only at the intake camshaft 21 but also at the exhaust camshaft 22, the exhaust-side VVT mechanism just needs to be positioned at a prescribed position by actuating the exhaust-side VVT mechanism toward the advance side at the time of a failure of the crank position sensor 31, and the prescribed position may be desirably the most advanced position.

In the above-described embodiment, when it is determined that there is a failure in the crank position sensor 31, fuel injection and ignition are temporarily stopped while the VVT mechanism 40 is actuated toward the retardation side; however, control is not limited to this configuration. The fuel injection amount may be reduced or the ignition timing may be retarded. This is effective in order to avoid occurrence of engine stalling during idling, or the like.

In the above-described embodiment, fail-safe control is used to allow the vehicle to retreat; however, the fail-safe control is not limited to this configuration. The VVT mechanism is not limited to the electric VVT mechanism 40 as described in the embodiment, and may be, for example, a hydraulic VVT mechanism. In this case, when it is determined that there is a failure in the crank position sensor 31, the VVT mechanism just needs to be actuated toward a position at which the VVT mechanism may be fixed with a lock pin.

In the above-described embodiment, the description is made on the example in which the invention is applied to the port-injection engine 1; however, the invention is not limited to this configuration. The invention is also applicable to an in-cylinder direct-injection engine and is also applicable to an engine that includes both a port-injection fuel injection valve and an in-cylinder injection fuel injection valve. In addition, the invention is not limited to the four-cylinder engine as described in the embodiment. The invention is also applicable to an engine having any number of cylinders, such as six cylinders. The invention is not limited to an in-line multicylinder engine. The invention is also applicable to a V-type multicylinder engine.

The invention is applicable to the internal combustion engine (engine) including the VVT mechanism, and is able to execute appropriate fail-safe control when there occurs a failure in the crank position sensor, so the invention is particularly effective to the case where the engine is mounted on a passenger car, or the like.

The invention claimed is:

1. A control device for an internal combustion engine, the internal combustion engine including an intake valve, a cam, a cam position sensor, a crank position sensor, and an intake-side variable valve timing mechanism,
    the intake-side variable valve timing mechanism configured to:
        be driven by an electric motor,
        operate within a predetermined phase angle range, and continuously advance and retard a phase of the cam that actuates the intake valve;
    the control device comprising an electronic control unit configured to:
        determine that there is a failure in the crank position sensor;
        when the electronic control unit has determined that there is the failure in the crank position sensor, actuate the intake-side variable valve timing mechanism toward a retardation side, position the intake-side variable valve timing mechanism at a prescribed position, and execute fail-safe control based on a signal from the cam position sensor instead of a signal from the crank position sensor, the prescribed position being a most retarded position in the predetermined phase angle range;
        determine that an engine rotation speed is higher than or equal to a predetermined value at a timing at which the electronic control unit has determined that there is the failure in the crank position sensor;
        when the electronic control unit has determined that the engine rotation speed is higher than or equal to the predetermined value, after the electronic control unit has determined that there is the failure in the crank position sensor, and after the intake-side variable valve timing mechanism is positioned at the most retarded position, begin to stop energization of the electric motor while the intake-side variable valve timing mechanism remains positioned at the most retarded position; and
        continue energization of the electric motor when the engine rotation speed is lower than the predetermined value after the intake-side variable valve timing mechanism is positioned at the most retarded position.

2. The control device according to claim 1, wherein the electronic control unit is configured to stop supplying fuel to the internal combustion engine until the intake-side variable valve timing mechanism reaches the prescribed position, when the electronic control unit has determined that there is the failure in the crank position sensor and has actuated the intake-side variable valve timing mechanism toward the retardation side.

3. The control device according to claim 1, wherein the internal combustion engine is mounted on a vehicle, and
    the fail-safe control is a control for allowing the vehicle to operate in a state in which a throttle opening degree is limited irrespective of a signal from an acceleration operation amount sensor.

4. The control device according to claim 3, wherein a timing at which the signal is generated from the cam position sensor is set in correspondence with a timing at which fuel is injected to at least one cylinder during the fail-safe control or a timing at which the at least one cylinder is ignited during the fail-safe control.

5. A control method for an internal combustion engine, wherein
    the internal combustion engine includes an intake valve, a cam, a cam position sensor, a crank position sensor, an intake-side variable valve timing mechanism, and an electronic controller,
    the control method comprising:
    driving the intake-side variable valve timing mechanism by an electric motor;
    operating the intake-side variable valve timing mechanism within a predetermined phase angle range;
    continuously advancing and retarding, with the intake-side variable valve timing mechanism, operation timing of the intake valve;
    determining, by the electronic controller, that there is a failure in the crank position sensor;
    retarding, by the electronic controller, when the electronic controller has determined that there is the failure in the crank position sensor, the operation timing of the intake valve to a prescribed position, and executing fail-safe control based on a signal from the cam position sensor instead of a signal from the crank position sensor, the prescribed position being a most retarded position in the predetermined phase angle range;

determining, by the electronic controller, that an engine rotation speed is higher than or equal to a predetermined value at a timing at which the electronic controller has determined that there is the failure in the crank position sensor;

when the electronic controller has determined that the engine rotation speed is higher than or equal to the predetermined value, after the electronic controller has determined that there is the failure in the crank position sensor, and after the intake-side variable valve timing mechanism is positioned at the most retarded position, begin stopping, by the electronic controller, energization of the electric motor while the intake-side variable valve timing mechanism remains positioned at the most retarded position; and continuing, by the electronic controller, energization of the electric motor when the engine rotation speed is lower than the predetermined value after the intake-side variable valve timing mechanism is positioned at the most retarded position.

6. The control method according to claim 5, further comprising:

stopping, by the electronic controller, supplying fuel to the internal combustion engine until the intake-side variable valve timing mechanism reaches the prescribed position, when the electronic controller has determined that there is the failure in the crank position sensor and has actuated the intake-side variable valve timing mechanism toward the retardation side.

7. The control method according to claim 5, wherein the internal combustion engine is mounted on a vehicle, and the fail-safe control is a control for allowing the vehicle to operate in a state in which a throttle opening degree is limited irrespective of a signal from an acceleration operation amount sensor.

8. The control method according to claim 7, wherein a timing at which the signal is generated from the cam position sensor is set in correspondence with a timing at which fuel is injected to at least one cylinder during the fail-safe control or a timing at which the at least one cylinder is ignited during the fail-safe control.

9. A control device for an internal combustion engine, the internal combustion engine including an intake valve, a cam, a cam position sensor, a crank position sensor, and an intake-side variable valve timing mechanism, the intake-side variable valve timing mechanism configured to:
  be driven by an electric motor,
  operate within a predetermined phase angle range, and
  continuously advance and retard a phase of the cam that actuates the intake valve;

the control device comprising processing circuitry configured to:
  determine that there is a failure in the crank position sensor;
  when the processing circuitry has determined that there is the failure in the crank position sensor, actuate the intake-side variable valve timing mechanism toward a retardation side, position the intake-side variable valve timing mechanism at a prescribed position, and execute fail-safe control based on a signal from the cam position sensor instead of a signal from the crank position sensor, the prescribed position being a most retarded position in the predetermined phase angle range;

determine that an engine rotation speed is higher than or equal to a predetermined value at a timing at which the processing circuitry has determined that there is the failure in the crank position sensor;

when the processing circuitry has determined that the engine rotation speed is higher than or equal to the predetermined value, after the processing circuitry has determined that there is the failure in the crank position sensor, and after the intake-side variable valve timing mechanism is positioned at the most retarded position, begin to stop energization of the electric motor while the intake-side variable valve timing mechanism remains positioned at the most retarded position; and continue energization of the electric motor when the engine rotation speed is lower than the predetermined value after the intake-side variable valve timing mechanism is positioned at the most retarded position.

10. The control device according to claim 9, wherein the processing circuitry is configured to stop supplying fuel to the internal combustion engine until the intake-side variable valve timing mechanism reaches the prescribed position, when the processing circuitry has determined that there is a failure in the crank position sensor and has actuated the intake-side variable valve timing mechanism toward the retardation side.

11. The control device according to claim 9, wherein the internal combustion engine is mounted on a vehicle, and the fail-safe control is a control for allowing the vehicle to operate in a state in which a throttle opening degree is limited irrespective of a signal from an acceleration operation amount sensor.

12. The control device according to claim 11, wherein a timing at which the signal is generated from the cam position sensor is set in correspondence with a timing at which fuel is injected to at least one cylinder during the fail-safe control or a timing at which the at least one cylinder is ignited during the fail-safe control.

13. The control device according to claim 1, wherein after the electronic control unit has determined that there is the failure in the crank position sensor, the electronic control unit is configured to use the electric motor to actuate the intake-side variable valve timing mechanism and position the intake-side variable valve timing mechanism at the most retarded position.

14. The control method according to claim 5, wherein the retarding, by the electronic controller, includes using the electronic motor to actuate the intake-side variable valve timing mechanism and position the intake-side variable valve timing mechanism at the most retarded position after the electronic controller has determined that there is the failure in the crank position sensor.

15. The control device according to claim 9, wherein after the processing circuitry has determined that there is the failure in the crank position sensor, the processing circuitry is configured to use the electric motor to actuate the intake-side variable valve timing mechanism and position the intake-side variable valve timing mechanism at the most retarded position.

* * * * *